United States Patent
Niemela et al.

(10) Patent No.: US 9,647,822 B2
(45) Date of Patent: May 9, 2017

(54) METHOD AND DEVICE FOR PROCESSING DATA BLOCKS AND COMMUNICATION SYSTEM COMPRISING SUCH DEVICE

(75) Inventors: Kari Juhani Niemela, Oulu (FI); Olli Juhani Piirainen, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 736 days.

(21) Appl. No.: 12/866,756

(22) PCT Filed: Feb. 5, 2009

(86) PCT No.: PCT/EP2009/051302
§ 371 (c)(1),
(2), (4) Date: Nov. 8, 2010

(87) PCT Pub. No.: WO2009/101020
PCT Pub. Date: Aug. 20, 2009

(65) Prior Publication Data
US 2011/0051631 A1   Mar. 3, 2011

(30) Foreign Application Priority Data

Feb. 12, 2008   (EP) .................... 08002558

(51) Int. Cl.
*H04J 3/00* (2006.01)
*H04L 5/12* (2006.01)
*H04L 5/22* (2006.01)
*H04L 27/34* (2006.01)

(52) U.S. Cl.
CPC .................. *H04L 5/12* (2013.01); *H04L 5/22* (2013.01); *H04L 27/3416* (2013.01)

(58) Field of Classification Search
CPC .................................................. H04B 7/2656
USPC .......................................................... 370/280
See application file for complete search history.

(56) References Cited

U.S. PATENT DOCUMENTS

| | | | |
|---|---|---|---|
| 2006/0092877 A1 | 5/2006 | Niemela | 370/330 |
| 2006/0256839 A1* | 11/2006 | Tsai et al. | 375/131 |
| 2008/0117873 A1* | 5/2008 | Ranta-Aho et al. | 370/329 |
| 2008/0144600 A1* | 6/2008 | Anderson | 370/350 |
| 2012/0008617 A1* | 1/2012 | Tsai et al. | 370/345 |

FOREIGN PATENT DOCUMENTS

| | | |
|---|---|---|
| GB | 2 389 757 A | 12/2003 |
| WO | WO 99/22559 | 5/1999 |
| WO | WO 00/02341 | 1/2000 |

OTHER PUBLICATIONS

Janssen, G.J.M., "Dual-Signal Receiver Structures for Simultaneous Reception of Two BPSK Modulated Co-channel Signals Using Signal Cancellation", 1994, 8453 Wireless Personal Communications 1, No. 1, Dordrecht, NL, pp. 43-59.

(Continued)

*Primary Examiner* — Christopher R Crompton
(74) *Attorney, Agent, or Firm* — Harrington & Smith

(57) ABSTRACT

A method and a device for processing data blocks are provided, wherein each resource unit includes at least two portions of user data, wherein each portion of user data is associated with a user; and wherein subsequent resource units include different combinations of portions of user data. Furthermore, a communication system is provided comprising such a device.

32 Claims, 3 Drawing Sheets

(56) References Cited

OTHER PUBLICATIONS

3GPP TSG GERAN #36, Tdoc GP-071792, "Voice Capacity Evolution with Orthogonal Sub Channels", Nov. 12-16, 2007, Vancouver, Canada, Source: Nokia Siemens Networks, Nokia Corporation, 12 pgs.

* cited by examiner

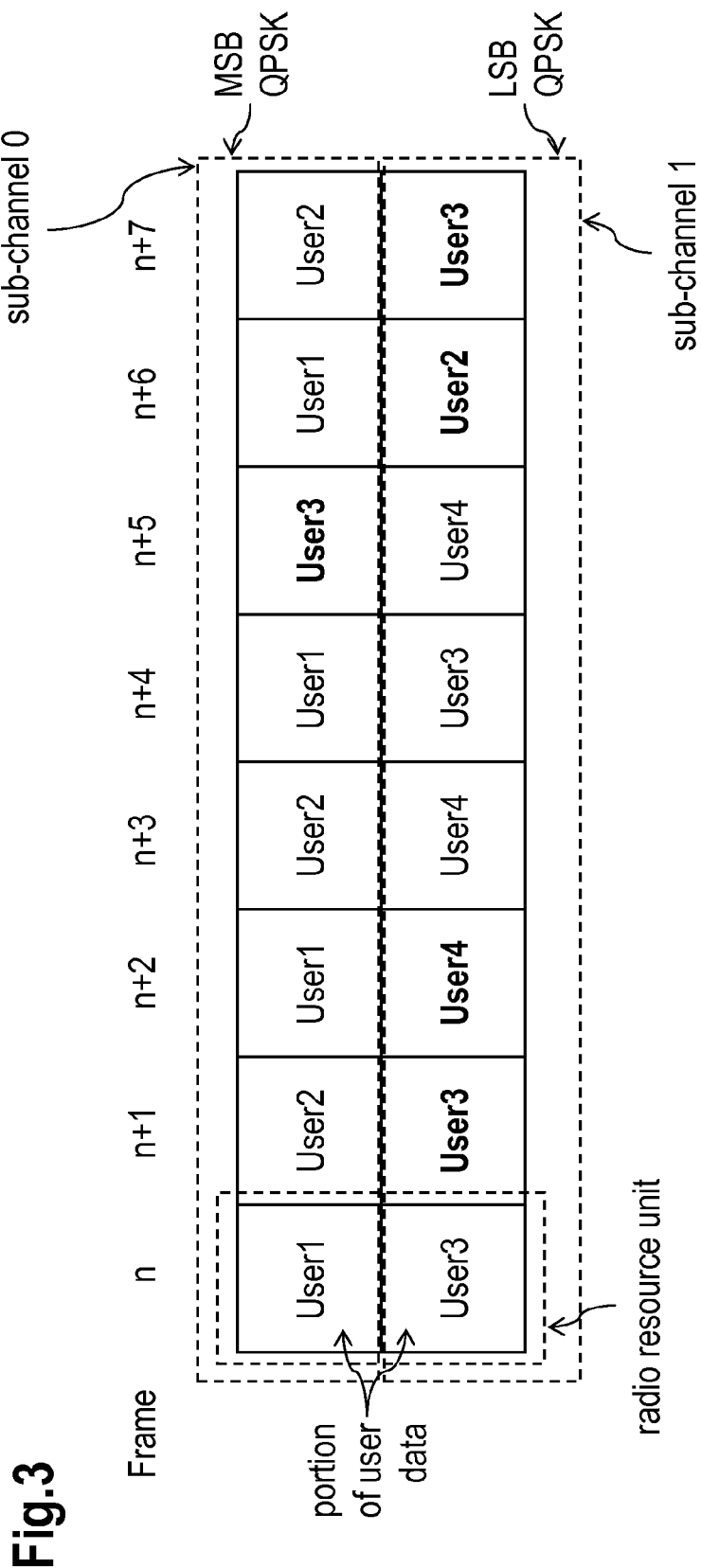

METHOD AND DEVICE FOR PROCESSING DATA BLOCKS AND COMMUNICATION SYSTEM COMPRISING SUCH DEVICE

The invention relates to a method and to a device for processing data blocks and to a communication system comprising such a device.

An orthogonal sub channel (OSC) concept (see [1]) multiplexes two mobile stations on the same radio resource. Orthogonal sub channels are separated by using different training sequences. OSC is applicable all handsets, since the concept is based on a Gaussian Minimum-Shift Keying (GMSK) capability of the mobile stations applicable for both downlink and uplink. OSC can considerably increase voice capacity through, e.g., a double half-rate channel providing 4 users multiplexed to the same radio slot.

The orthogonal sub channel concept in downlink is based on QPSK like modulation, where each of the sub channels is mapped so that it can be received as or similar to a GMSK signal.

In uplink direction, mobiles allocated to the orthogonal sub channels may use the genuine GMSK or BPSK-like modulation with different training sequences. Both orthogonal sub channels are simultaneously received by a base station that needs to employ, e.g., diversity, interference cancellation and/or multi-user detection means to separate the orthogonal sub channels.

Discontinuous transmission (DTX) is a method that utilizes the fact that during a typical conversation a person speaks less that 40 percent of the time and hence DTX can turn off the transmitter during silence periods. This minimizes interference and hence increases an overall capacity of the system. According to Adaptive Multi-Rate (AMR) codec simulations, the average activity of a user is about 60% and the average length of an activity period is around 1 second.

Basically, two users are allocated on different midamble codes within the same timeslot (resource unit) in order to provide downlink traffic to these two users in parallel. The separation of users in downlink direction is based on separating real signals in a complex QPSK modulation plane and in uplink direction the setup is basically a virtual MIMO setup. The OSC proposal is operable with existing standards and legacy hardware.

However, in OSC the two users assigned in parallel to one radio resource unit interfere with each other resulting in a degradation of the radio link performance. Channel coding works suboptimal with DTX, if a whole interleaved block period, i.e. a data block of one user, is constantly interfered by another user, in particular if voice lasts for several data block periods.

The problem to be solved is to overcome the disadvantages stated above and in particular to provide a stable and efficient improvement of speech capacity in a network.

This problem is solved according to the features of the independent claims. Further embodiments result from the depending claims.

In order to overcome this problem, a method for processing data comprising several resource units is provided,
wherein each resource unit comprises at least two portions of user data, wherein each portion of user data is associated with a user;
wherein subsequent resource units comprise combinations of portions of user data from different users.

This efficiently enables mixing and changing the multiplexing of users within the resource units.

Mixing of users with discontinuous transmission (DTX) spreads the interference generated by an activity period of one user to data blocks of more than one other users and allows an improved gain from channel coding.

The approach provided in particular allows improvement of a speech capacity in a mobile network, e.g., in a GSM network, in a 3G network or in an LTE network by utilizing the same frequency and/or time for several users.

In an embodiment, the user is associated with and/or comprises at least one of the following:
a subscriber;
a device;
a terminal, in particular a mobile terminal;
a portion of traffic or data associated with a user or subscriber or with a device that is associated with a user or with a subscriber;
user-originated data or traffic;
a logical or physical channel;
a logical or physical address;
a voice channel
point-to-point traffic.

In another embodiment, the portions of user data are reordered and/or shuffled among said resource units in particular in a time domain.

In a further embodiment, said portions of user data are assigned to resource units according to an interleaving pattern, in particular according to a multichannel interleaving pattern. Preferably, a data block of a user is distributed among several user data portions of said user, wherein such distribution changes according to said interleaving pattern.

For example, a pattern may define a half-rate (HR) sub-channel and/or an OSC sub-channel for each portion of user data.

In a next embodiment, said portions of user data are assigned to resource units according to a hopping scheme.

Hence, a pattern may define associated frequency hopping schemes or variations thereof as well as an OSC sub-channel for each portion of user data or said pattern may also include an association with a HR sub-channel.

The hopping scheme can in particular be (or be similar to) a frequency hopping mechanism. In this case it has to be ensured, that two users sharing the same resource unit are provided with or have different training sequences.

It is also an embodiment that one portion of user data in a first resource unit is combined with at least one other portion of a different user data in a second resource unit.

Hence, combinations comprising at least one portion of user data can be differently configured according to various approaches of shuffling or re-ordering.

Pursuant to another embodiment, said resource unit is a radio resource unit.

According to an embodiment, said resource unit comprises at least two portions of a modulation. In particular, the resource unit may comprise at least two bit combinations of a modulation. Preferably, the resource unit utilizes at least one LSB and/or at least one MSB of a modulation. Said modulation may be a GMSK and/or a QPSK modulation or any higher order modulation.

According to another embodiment, each resource unit and/or the portion of user data is or comprises or is associated with at least one of the following:
a burst;
a carrier;
a slot;
a sub frame;
a frame.

In yet another embodiment, the data block are processed in a communication network utilizing at least one of the following technologies:
- Orthogonal Frequency-Division Multiple Access (OFDMA);
- Single Carrier Frequency Division Multiple Access (SC-FDMA);
- Time Division Multiple Access (TDMA);
- Frequency Division Multiple Access (FDMA);
- Time Division Duplex (TDD);
- Frequency Division Duplex (FDD).

According to a next embodiment, said data processing is provided in downlink and/or in uplink direction.

Pursuant to yet an embodiment, the approach utilizes discontinuous transmission (DTX).

The problem stated above is also solved by a device for processing data packets comprising a processor unit or any logic device (e.g., ASIC or FPGA) that is equipped and/or arranged such that the method as described herein is executable thereon.

According to an embodiment, the device is a communication device, in particular a network element, e.g., a GSM network, a 3G network or an LTE network.

The problem stated supra is further solved by a communication system comprising the device as described herein.

Embodiments of the invention are shown and illustrated in the following figures:

FIG. 3 shows the structure according to FIG. 1 with different user allocation according to a multichannel interleaving approach.

Discontinuous transmission (DTX) is a method that utilizes the fact that during a typical conversation a person speaks less that 40 percent of the time and hence DTX turns off the transmitter during silence periods.

The approach provided herein efficiently utilizes DTX.

Figure 1:
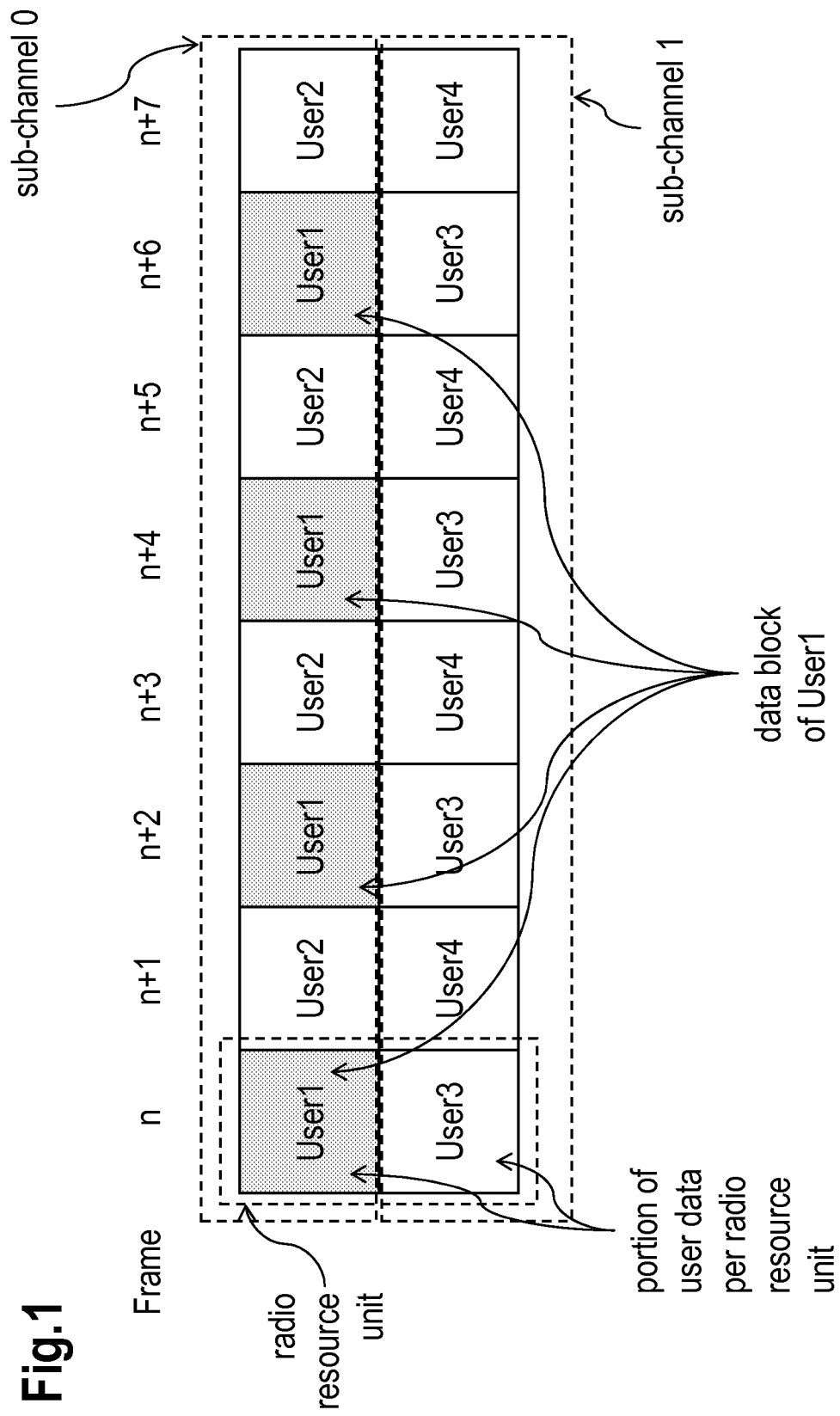
FIG. 1 shows an exemplary OSC transmission data structure with 4 users sharing a TDMA slot (half-rate (HR) transmission)

FIG. 1 shows an exemplary OSC transmission data structure with 4 users sharing a TDMA slot (half-rate (HR) transmission).

In particular, FIG. 1 shows radio resource units or frames for different time periods n . . . n+7. Each radio resource unit comprises two portions of user data, each being associated with a user (User1 to User4). For each radio resource unit (i.e. for each given frame or time period of the TDMA slot) two combinations of portions of user data, i.e. {User1; User3}, {User2; User4}, take turns.

The upper row (sub-channel 0) of radio resource units depicted in FIG. 1 may utilize a most significant bit (MSB) of a quadrature phase shift keying (QPSK) modulation and the bottom row (sub-channel 1) may utilize a least significant bit (LSB) of the QPSK modulation.

Based on FIG. 1, an interleaving and/or a frequency hopping may be utilized for each radio resource unit to which two (or more) portions of user data are assigned. Each user may run DTX services comprising active and inactive periods. A mean active period length may amount to about 1 s, which is significantly longer than the period of a code block (i.e. 4 bursts over a period of 8 frames amounting to less than 40 ms). As for each user there is a fixed pair (or combination) of portions of user data, the respective data block is either in active or in inactive state for the duration of the whole code block. This, however, is rather inefficient for channel coding purposes.

In order to provide a more efficient approach, the users, in particular the portions of user data associated with a particular user, of OSC-type sub channels allocated to radio resource units may be reordered or shuffled such that different combinations of users are transmitted in the resource units of a code block.

Figure 2:
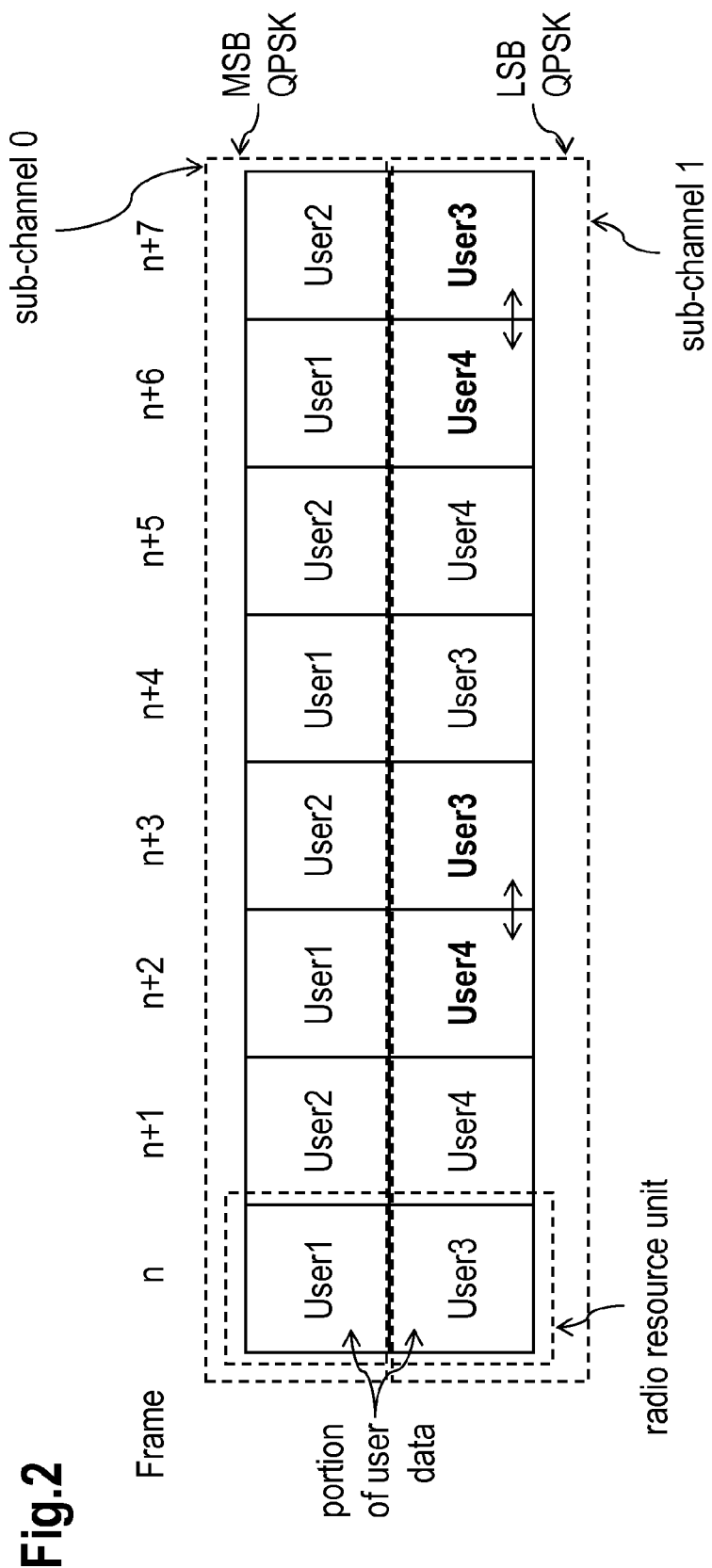
FIG. 2 shows the structure according to FIG. 1 with different user allocation with re-ordering in the time domain.

The reordering can be conducted, e.g., as follows:
a. The users may be re-ordered in the time domain as shown in FIG. 2, which is based on FIG. 1 and visualizes single portions of user data switching places with one another.
b. Another possibility of reordering is to perform a multi (sub-)channel interleaving as depicted in FIG. 3. Here, a particular portion of user data associated with User1 shares radio resource units with three other users. In addition, User3 utilizes the MSB QPSK sub-channel 0 as well as the LSB QPSK sub-channel 1 in downlink direction.
c. It is also an option utilizing different frequency hopping sequences for different half-rate sub-channels. This enables resource sharing with up to min(m, 4n-1) users, where m equals, e.g., an interleaving length or size of a data block in number of resource units and n equals to number of frequencies.

In multichannel interleaving, radio resources can be reordered within the same code block (interleaving length). Such concept may apply alternatively or in addition to time domain reordering.

A user diversity pattern may determine which radio resource unit (e.g., sub-channel, i.e. constellation bit MSB or LSB, linked with a training sequence) and which resource unit, e.g., HR sub-timeslot, to be used over time.

Effectively, users may be "hopping", e.g., between two half-rate (HR) sub channels according to a given hopping-pattern but keeping the data rate substantially the same.

The mixing of users will increase a variance of the number of active users during a code block. This increased variance provides diversity to channel coding, leading to an improved operation of said channel coding.

Hence, significant gain is provided by the reordering and/or mixing mechanisms suggested.

Frequency Hopping can be deployed as follows: Each user may utilize at least two (different) hopping patterns comprising
- a hopping sequence number (HSN);
- a mobile allocation (MA); and
- a mobile allocation index offset (MAIO).

Additional "user diversity"-patterns may be provided to determine which radio resource unit (e.g., sub channel, i.e., constellation bit MSB or LSB linked with TRS) and which hopping pattern is used in each data block (frame).

If more than two frequency hopping patterns (i.e. logical carriers) are involved, more users (up to said interleaving length) can be multiplexed pursuant to the user diversity.

Hence, according to the approach suggested, one radio resource unit can be shared between at least two users. One resource unit (associated with, e.g., a transmission time interval TTI) comprises at least two portions of user data.

A radio resource unit and/or a portion of user data may be or may be associated with a burst, a carrier, a slot, a frame, a sub frame, etc.

The radio resource may comprise at least one of the following:
- Orthogonal Frequency-Division Multiple Access (OFDMA);
- Single Carrier Frequency Division Multiple Access (SC-FDMA);
- Time Division Multiple Access (TDMA);

Time Division Duplex (TDD).

A user may be or may be associated with any kind of traffic that may be connected or associated with a real user or subscriber or with a device connected to said user or subscriber. The user as referred to herein may also relate to any kind of channel or address that can in particular help to separate different data (e.g., data provided from one logical or physical address to another logical or physical address).

FURTHER ADVANTAGES

The approach provided significantly improves the performance of the an OSC scheme.

The solution may apply for Uplink as well as for Downlink communication.

In Downlink direction, a similar gain can be reached as in Uplink direction. During one particular user's DTX inactive period, the other users can use GMSK instead of QPSK and, thus, a 3 dB power gain may be obtained.

Additionally, further gain improvement may be obtained depending on a pulse shape selected in Downlink direction or on power control aspects.

ABBREVIATIONS

AMR Adaptive Multi-Rate
DL Downlink (traffic to the mobile terminal)
DTX Discontinuous Transmission
FER Fault Error Rate
FR Full Rate
GMSK Gaussian Minimum-Shift Keying
HR Half-Rate
HSN Hopping Sequence Number
LSB Least Significant Bit
LTE Long-Term Evolution
MA Mobile Allocation
MAIO Mobile Allocation Index Offset
MSB Most Significant Bit
OFDMA Orthogonal Frequency-Division Multiple Access
OSC Orthogonal Sub Channel
QPSK Quadrature Phase Shift Keying
SC-FDMA Single Carrier Frequency Division Multiple Access
TDD Time Division Duplex
TDMA Time Division Multiple Access
TRS Training Sequence
TTI Transmission Time Interval
TX Transmission
UL Uplink

REFERENCES

[1] 3GPP TSG GERAN #36, Tdoc GP-071792, Vancouver, Canada, Agenda Item 6.1, 7.1.5.18, 12-16 Nov. 2007, http://www.3gpp.org/ftp/tsg_geran/TSG_GERAN/GERAN_36_Vancouver/Docs/GP-071792.zip

The invention claimed is:
1. A method comprising:
processing data comprising a plurality of resource units,
wherein each resource unit comprises two portions of user data,
wherein, in a time domain, a plurality of users are associated with subsequent resources units and associated with an original combination of users in the resource units,
wherein said portions of user data are originally assigned to resource units according to an interleaving pattern, and
wherein the interleaving pattern defines a half-rate (HR) sub-channel and/or an OSC sub-channel for each portion of user data; and
reordering or shuffling portions of user data relating to a particular user of the plurality of users between the subsequent resource units such that different combinations of user data relating to the particular user of the plurality of users are transmitted in the subsequent resource units,
wherein the original combination of users in the resource units is not maintained over the time domain,
wherein a data block of the particular user is distributed among several user data portions of said user, and
wherein such distribution changes according to said interleaving pattern.

2. The method according to claim 1, wherein the particular user is associated with or comprises at least one of the following: a subscriber; a device; a mobile terminal; a portion of traffic or data; user-originated data or traffic; a logical or physical channel; a logical or physical address; a voice channel; or point-to-point traffic.

3. The method according to claim 1, wherein the reordering or shuffling is in a specified time domain.

4. The method according to claim 1, wherein said portions of user data are assigned to resource units according to a hopping scheme.

5. The method according to claim 1, wherein one portion of user data in a first resource unit is combined with at least one other portion of user data of a different user in a second resource unit.

6. The method according to claim 1, wherein said resource unit is a radio resource unit.

7. The method according to claim 1, wherein said resource unit comprises at least two portions of a modulation.

8. The method according to claim 7, wherein the resource unit comprises at least two bit combinations of a modulation.

9. The method according to claim 8, wherein the resource unit utilizes one or both of at least one LSB or at least one MSB of a modulation.

10. The method according to claim 9, wherein said modulation is a GMSK or a QPSK modulation or a higher order modulation.

11. The method according to claim 1, wherein each resource unit or the portion of user data is or comprises or is associated with at least one of the following: a burst; a carrier; a slot; a sub frame; or a frame.

12. The method according to claim 1, wherein the resource units are processed in a communication network utilizing at least one of the following technologies: Orthogonal Frequency-Division Multiple Access; Single Carrier Frequency Division Multiple Access; Time Division Multiple Access; or Time Division Duplex.

13. The method according to claim 1, wherein said processing is provided in downlink direction.

14. The method according to claim 1, wherein said processing is provided in uplink direction.

15. The method according to claim 1, utilizing discontinuous transmission.

16. An apparatus comprising:
at least one processor; and
at least one memory including computer program code;

the at least one memory and computer program code configured, with the at least one processor, to cause the device at least to perform:
   processing data comprising a plurality of resource units,
      wherein each resource unit comprises two portions of user data,
      wherein, in a time domain, a plurality of users are associated with subsequent resources units and associated with an original combination of users in the resource units,
      wherein said portions of user data are originally assigned to resource units according to an interleaving pattern, and
      wherein the interleaving pattern defines a half-rate (HR) sub-channel and/or an OSC sub-channel for each portion of user data; and
   reordering or shuffling the portions of user data relating to a particular user of the plurality of users between the subsequent resource units such that different combinations of user data relating to the particular user of the plurality of users are transmitted in the subsequent resource units,
      wherein the original combination of users in the resource units is not maintained over the time domain,
      wherein a data block of the particular user is distributed among several user data portions of said user, and
      wherein such distribution changes according to said interleaving pattern.

17. The apparatus according to claim 16, wherein said apparatus is in a communication network.

18. The apparatus according to claim 16, wherein the particular user is associated with or comprises at least one of the following: a subscriber; a device; a mobile terminal; a portion of traffic or data; user-originated data or traffic; a logical or physical channel; a logical or physical address; a voice channel; or point-to-point traffic.

19. The apparatus according to claim 16, wherein the reordering or shuffling is in a specified time domain.

20. The apparatus according to claim 16, wherein said portions of user data are assigned to resource units according to a hopping scheme.

21. The apparatus according to claim 16, wherein one portion of user data in a first resource unit is combined with at least one other portion of user data of a different user in a second resource unit.

22. The apparatus according to claim 16, wherein said resource unit is a radio resource unit.

23. The apparatus according to claim 16, wherein said resource unit comprises at least two portions of a modulation.

24. The apparatus according to claim 23, wherein the resource unit comprises at least two bit combinations of a modulation.

25. The apparatus according to claim 24, wherein the resource unit utilizes one or both of at least one LSB or at least one MSB of a modulation.

26. The apparatus according to claim 25, wherein said modulation is a GMSK or a QPSK modulation or a higher order modulation.

27. The apparatus according to claim 16, wherein each resource unit or the portion of user data is or comprises or is associated with at least one of the following: a burst; a carrier; a slot; a sub frame; or a frame.

28. The apparatus according to claim 16, wherein the resource units are processed in a communication network utilizing at least one of the following technologies: Orthogonal Frequency-Division Multiple Access; Single Carrier Frequency Division Multiple Access; Time Division Multiple Access; or Time Division Duplex.

29. The apparatus according to claim 16, wherein said processing is provided in downlink direction.

30. The apparatus according to claim 16, wherein said processing is provided in uplink direction.

31. The apparatus according to claim 16, utilizing discontinuous transmission.

32. A computer program product comprising a non-transitory computer readable storage medium having computer readable software code embodied therewith directly loadable into the internal memory of a digital computer to cause the digital computer, upon execution of the code portions, to perform:
   processing data comprising a plurality of resource units,
      wherein each resource unit comprises two portions of user data,
      wherein, in a time domain, a plurality of users are associated with subsequent resources units and associated with an original combination of users in the resource units,
      wherein said portions of user data are originally assigned to resource units according to an interleaving pattern, and
      wherein the interleaving pattern defines a half-rate (HR) sub-channel and/or an OSC sub-channel for each portion of user data; and
   reordering or shuffling the portions of user data relating to a particular user of the plurality of users between the subsequent resource units such that different combinations of user data relating to the particular user of the plurality of users are transmitted in the subsequent resource units,
      wherein the original combination of users in the resource units is not maintained over the time domain,
      wherein a data block of the particular user is distributed among several user data portions of said user, and
      wherein such distribution changes according to said interleaving pattern.

* * * * *